United States Patent [19]

Vernon et al.

[11] Patent Number: 5,214,421
[45] Date of Patent: May 25, 1993

[54] AUTOMATIC KEYBOARD AND MONITOR SWITCHING DEVICE

[75] Inventors: Jerome C. Vernon, Visalia; Ben G. Parsons, San Rafael, both of Calif.

[73] Assignee: Support Systems International Corp., Richmond, Calif.

[21] Appl. No.: 768,117

[22] Filed: Sep. 30, 1991

Related U.S. Application Data

[63] Continuation of Ser. No. 559,809, Jul. 30, 1990, abandoned.

[51] Int. Cl.5 .............................................. H04Q 1/00
[52] U.S. Cl. .............................. 340/825.03; 340/711; 340/717; 364/709.12; 235/146
[58] Field of Search ................... 340/717, 825.03, 711; 364/707, 709.12; 341/22, 20; 235/146

[56] References Cited

U.S. PATENT DOCUMENTS

| | | |
|---|---|---|
| 3,323,119 | 5/1967 | Barcomb et al. . |
| 3,453,384 | 7/1969 | Donner et al. . |
| 3,774,158 | 11/1973 | Clark . |
| 4,325,062 | 4/1982 | Devlin .................................. 340/717 |
| 4,404,551 | 9/1983 | Howse et al. . |
| 4,484,314 | 11/1984 | Thiypen ........................ 340/825.03 |
| 4,570,160 | 2/1986 | Imazeki et al. . |
| 4,642,761 | 2/1987 | Yanagiuchi et al. .................. 341/22 |
| 4,665,501 | 5/1987 | Saldin et al. . |
| 4,779,079 | 10/1988 | Hauck . |
| 4,965,559 | 10/1990 | Dye .................................... 340/717 |

OTHER PUBLICATIONS

*Black Box* Catalog of Data communications & computer devices, Jul. 1985, p. 123 (lower advertisement).

*Primary Examiner*—Donald J. Yusko
*Assistant Examiner*—Brian Zimmerman
*Attorney, Agent, or Firm*—Townsend and Townsend

[57] ABSTRACT

An apparatus for providing access to a computer via two or more alternative keyboard/monitor pairs. The invention comprises a switching box connected between the keyboard/monitor pairs and the computer for switching access between the keyboard/monitor pairs. Access is switched by depressing a key on the keyboard which a user wants to use. An automatic toggling function is executed which switches control to the keyboard upon which a key has been depressed.

8 Claims, 6 Drawing Sheets

# AUTOMATIC KEYBOARD AND MONITOR SWITCHING DEVICE

This application is a continuation of U.S. application Ser. No. 07/559,809 filed Jul. 30, 1990, now abandoned.

BACKGROUND OF THE INVENTION

The present invention relates generally to keyboards and monitors in a personal computer system. More particularly, the present invention relates to a switching device for switching control between two sets of keyboard/monitor pairs.

In recent years, the personal computer has become a necessity for a wide variety of individuals performing tasks in every conceivable industry. Nearly every personal computer includes a keyboard for inputting data and a monitor for providing the user with feedback from the computer as well as an indication as to data entered on the keyboard. The keyboard/monitor pair is customarily located in close proximity to the computer itself. This is mainly for convenience, especially in connection with the use of disk drives which are ordinarily built into, the computer unit itself.

For many applications, it is useful to access the computer from more than one location via an independent keyboard/monitor pair. For example, in the case where a scientist maintains an office and a laboratory in separate locations, he may want to access the same computer from each of these locations. Maintenance of the two keyboard/monitor pairs in the two locations requires a switching box which permits the user to switch access between the keyboard/monitor pair in the office and the keyboard/monitor pair in the laboratory.

The disadvantage of such a switching box is that it requires manual switching between the two keyboard/monitor pairs. Typically, the box is situated near one of the keyboard/monitor pairs. Therefore, use of the switching box becomes particularly inconvenient when the scientist sits down at the keyboard/monitor pair in the location where the switching box is not located. In this case, if the switching box is not set to the remote keyboard/monitor pair, the scientist must get up and go to the switching box to switch access to the remote location.

SUMMARY OF THE INVENTION

The present invention is an automatic switching apparatus for switching control between two or more keyboard/monitor pairs each connected to a computer. The present invention overcomes the problems associated with manual switching boxes by providing a user with the ability to switch access between keyboard/monitor pairs by merely typing any key on a keyboard which is to be used. The present invention eliminates the inconvenience associated with a manual switching device which the user must be near to switch control between one or more keyboard/monitor pairs.

The present invention is contained in a box situated between a central processing unit (CPU) of the computer and each of the keyboard/monitor pairs. Within the box is circuitry for detecting the direction and activity of signals occurring on the keyboards as well as channel select logic for choosing between the keyboard/monitor pairs.

The direction sense and control circuitry detects the direction of data and clock signals between either of the keyboards and the CPU and sets a group of bidirectional gates accordingly to transfer the signals in the proper direction. The activity sense logic monitors either one or both of the keyboards for activity and passes data and clock signals input on that keyboard to the CPU. Finally, the channel select logic permits a user to select a particular mode of operation for the system.

In an automatic mode, the system is set to automatically switch between the keyboard/monitor pairs upon detection of activity on one of the keyboards. The system may also be placed in a manual mode in which the user selects, via a switch, which keyboard is to be active.

The system includes a timer which functions to permit the active keyboard to lock-out the inactive keyboard for a preset period of time. Therefore, a user working on one keyboard will not lose control to a user attempting to use the inactive keyboard if keys on the active keyboard are continually depressed without the timer expiring between keystrokes. The preset time period is adjustable.

It should be understood from the following description that the automatic keyboard/monitor switching device is not a timesharing device. It is not intended to buffer and receive data entered simultaneously on more than one keyboard. Instead, it is a switching device for toggling control between the keyboards.

For a more complete understanding for the nature and advantages of the invention, reference should be made to the ensuing detailed description taken in conjunction with the accompanying drawings.

DETAILED DESCRIPTION OF THE DRAWINGS

Figure 1:
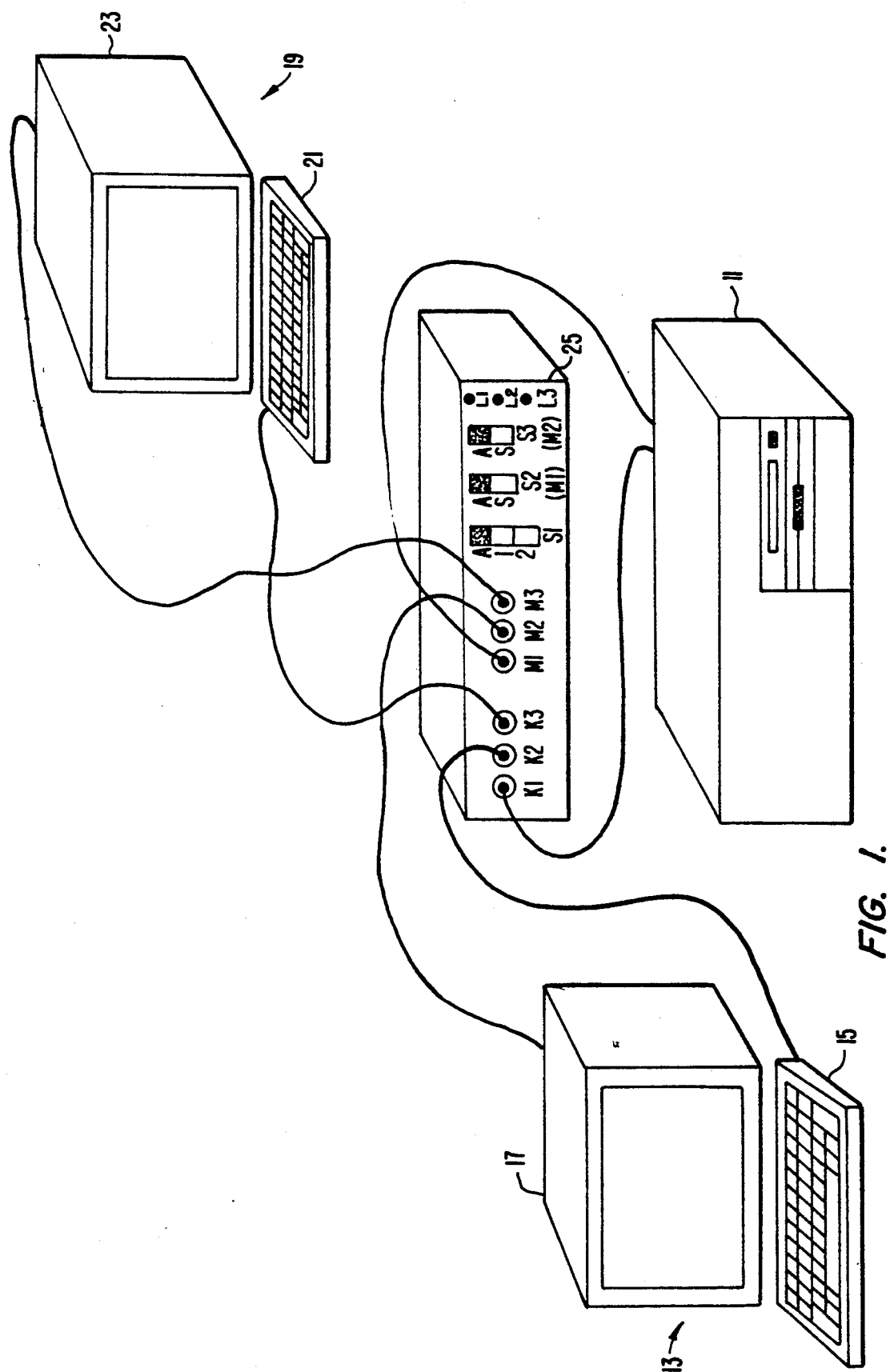
FIG. 1 is an overall system view including an automatic keyboard/monitor pair switching device.

FIG. 1 is an overall system view of a personal computer 11 connected to a first user station 13 and a second user station 19. First user station 13 includes a first keyboard 15 and a first monitor 17 and second station 19 includes a second keyboard 21 and a second monitor 23. Personal computer 11, first station 13, and second station 23 are connected such that access to computer 11 can be obtained through either first station 13 or second station 19 by depressing a key on appropriate keyboard 15 or keyboard 21.

The automatic switching function is carried out by automatic switching device 25. Automatic switching device 25 has a computer keyboard port K1 for transmitting keyboard signals between computer 11 and one of the keyboards 15 or 21. Keyboard 15 and keyboard 21 communicate signals to and from the computer through keyboard ports K2 and K3, respectively. A monitor port M1 on automatic switching device 25 is used to transmit video signals to one or both of monitors 17 and 23 which are connected to automatic switching device 25 through monitor ports M2 and M3, respectively.

Automatic switching device 25 includes a switch S1 for switching between an automatic mode and a manual mode. In the automatic mode, a user depresses a key on either keyboard to gain access to computer 11 through the station at which that keyboard is located. By placing switch S1 in either position "1" or "2," the corresponding keyboard is activated overriding the automatic mode. Switches S2 and S3 control the operation of monitors 17 and 23. In the "A" setting, each monitor automatically switches along with its corresponding keyboard. However, each monitor can be manually selected by placing switches S2 and S3 in the "S" mode. In this mode, the monitor will stay on even when its corresponding keyboard is inactive.

Lamp L1 is illuminated to indicate that the system is ready to be switched. Lamps L2 and L3 indicate which keyboard/monitor pair is currently selected.

Figure 2:
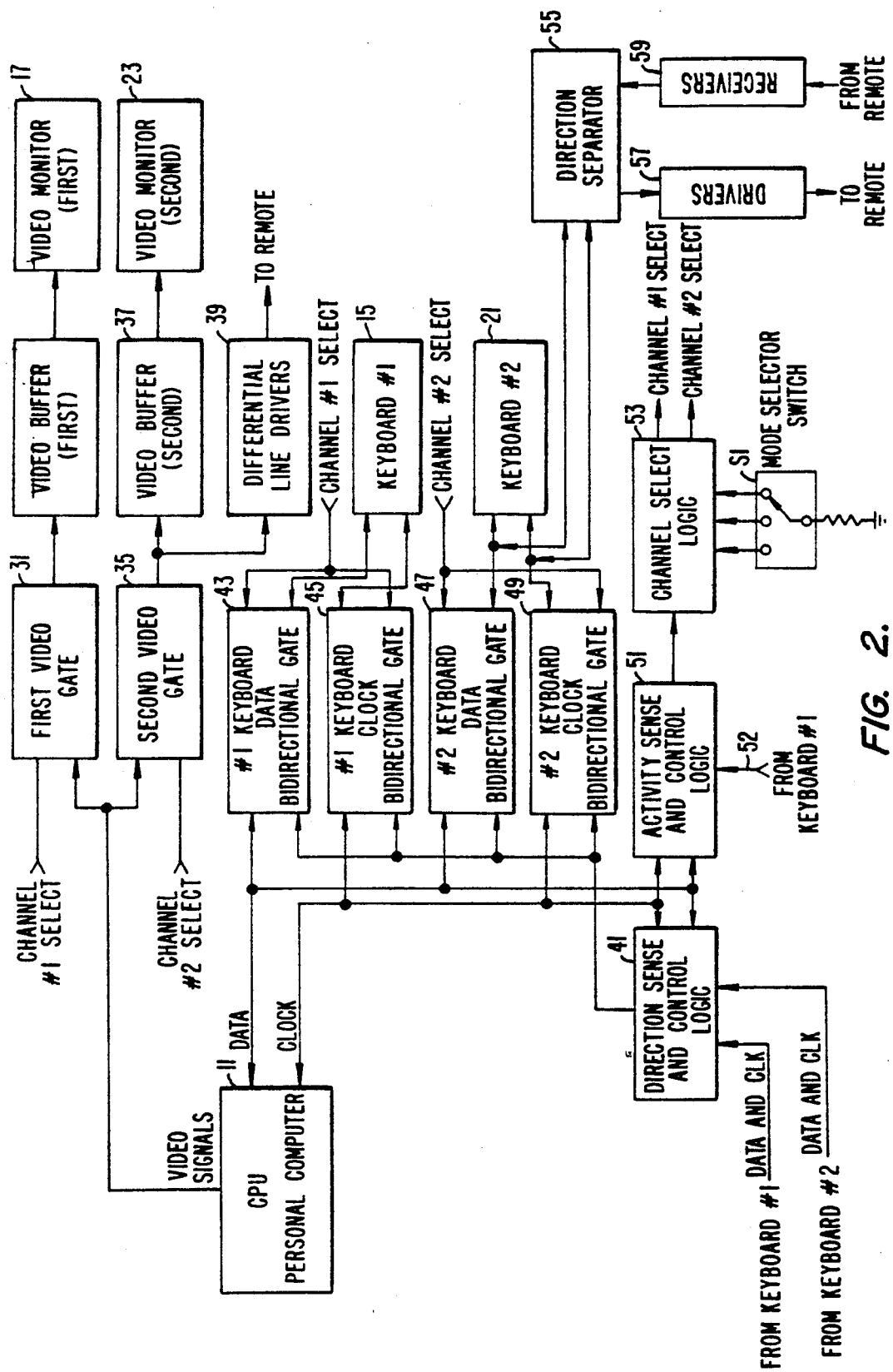
FIG. 2 is a block diagram of the system of FIG. 1 including the various circuit components of an automatic keyboard/monitor switching device.

FIG. 2 is an overall system diagram showing the components of FIG. 1 including a more detailed block diagram of the internal circuitry of automatic switching device 25. Automatic switching device 25 includes video circuitry for receiving video signals from CPU 11. The video circuitry is broken down into two branches. The first branch includes a first video gate 31 for receiving the video signals from computer 11 on a first input. A second input of video gate 31 receives a channel select signal which is active when first station 13 is to be selected and is inactive when station 13 is not selected. In the case where station 13 is selected, signals are transferred through a first video gate 31 to a first video buffer 133 which buffers the signals before transmitting them to first video monitor 17.

The second branch of the video circuitry is identical to the first branch except that it includes circuitry for long distance transmission. A second video gate 35 receives signals from CPU 11 on a first input. A channel select line is connected to a second input to video gate 35 and determines whether or not station 19 is selected. The video signals are transferred through a second video buffer 37 to second video monitor 23. Between video gate 35 and video buffer 37, a differential line driver 39 is connected. Line driver 39 converts the video signals received from video gate 35 into differential signals. Differential signals may be transmitted over a set of long cables and are not affected by interference or noise. Line driver 39 is an option which may be installed where the second keyboard is located at a remote location which is a great distance from computer 11.

A number of circuits are connected to the data and clock lines of computer 11. A DIRECTION SENSE/CONTROL CIRCUIT 41 receives input lines from each of the keyboards 15 and 21 as well as the data and clock lines from computer 11. DIRECTION SENSE/CONTROL CIRCUIT 41 determines which direction to transmit data and clock signals by sensing the input of data and clock signals on its various lines. Once it has determined which direction data and clock signals are being communicated in, it sets the direction of bidirectional gates 43, 45, 47, and 49. These gates control the direction of communication flow between CPU 11 and keyboards 15 and 21.

An ACTIVITY SENSE/CONTROL BLOCK 51 detects activity on keyboard 15 and activates bidirectional gates 43, 45, 47, and 49 depending on which keyboard is communicating with CPU 11. In a preferred embodiment, ACTIVITY SENSE/CONTROL BLOCK 51 receives signals from keyboard 15 on line 52. When it detects activity on line 52 it transmits a signal to a CHANNEL SELECT BLOCK 53. If no activity is detected on line 52, the automatic switching device defaults to selecting keyboard 21. This technique requires the least amount of circuitry. Of course, it should be understood that ACTIVITY SENSE/CONTROL BLOCK 51 could be configured to receive signals from both keyboards 15, 21 and maintain the last-used keyboard as the active keyboard. However, this technique is more complicated and would require additional circuitry.

CHANNEL SELECT BLOCK 53 receives signals from ACTIVITY SENSE/CONTROL BLOCK 51 indicating activity on keyboard 15 and transmits an appropriate channel select signal selecting either keyboard 15 or keyboard 21. The channel select signal is also transmitted to video gates 31 and 35 for selecting the matching monitor for the active keyboard. However, usually both monitors will display data simultaneously. Mode selector switch S1 is shown and is used to select the mode of automatic switching device 25 to be either automatic or manual. In the manual mode, the user may select which keyboard/monitor pair is active by setting switch S1 to position "1" or "2" thereby overriding ACTIVITY SENSE/CONTROL BLOCK 51. In the automatic mode, the channel is selected depending upon the activity sensed on keyboards 15 and 21 by ACTIVITY SENSE/CONTROL BLOCK 51.

Connected between bidirectional gates 47 and 49 and keyboard 21, is a direction separator 55. This circuit permits connection of keyboard 21 at a distant location. It is used in conjunction with line driver 39 for the monitor. Direction separator 55 receives signals from bidirectional gates 47 and 49 and converts them to differential signals. Conversion is made so that signals being transmitted over long cables will not be affected by noise and other interference present on a set of extension cables connecting the keyboard to the CPU. Driver circuitry 57 and receiver circuitry 59 are connected to a remote keyboard to which signals are transmitted and from which signals are received, respectively.

Figure 3:
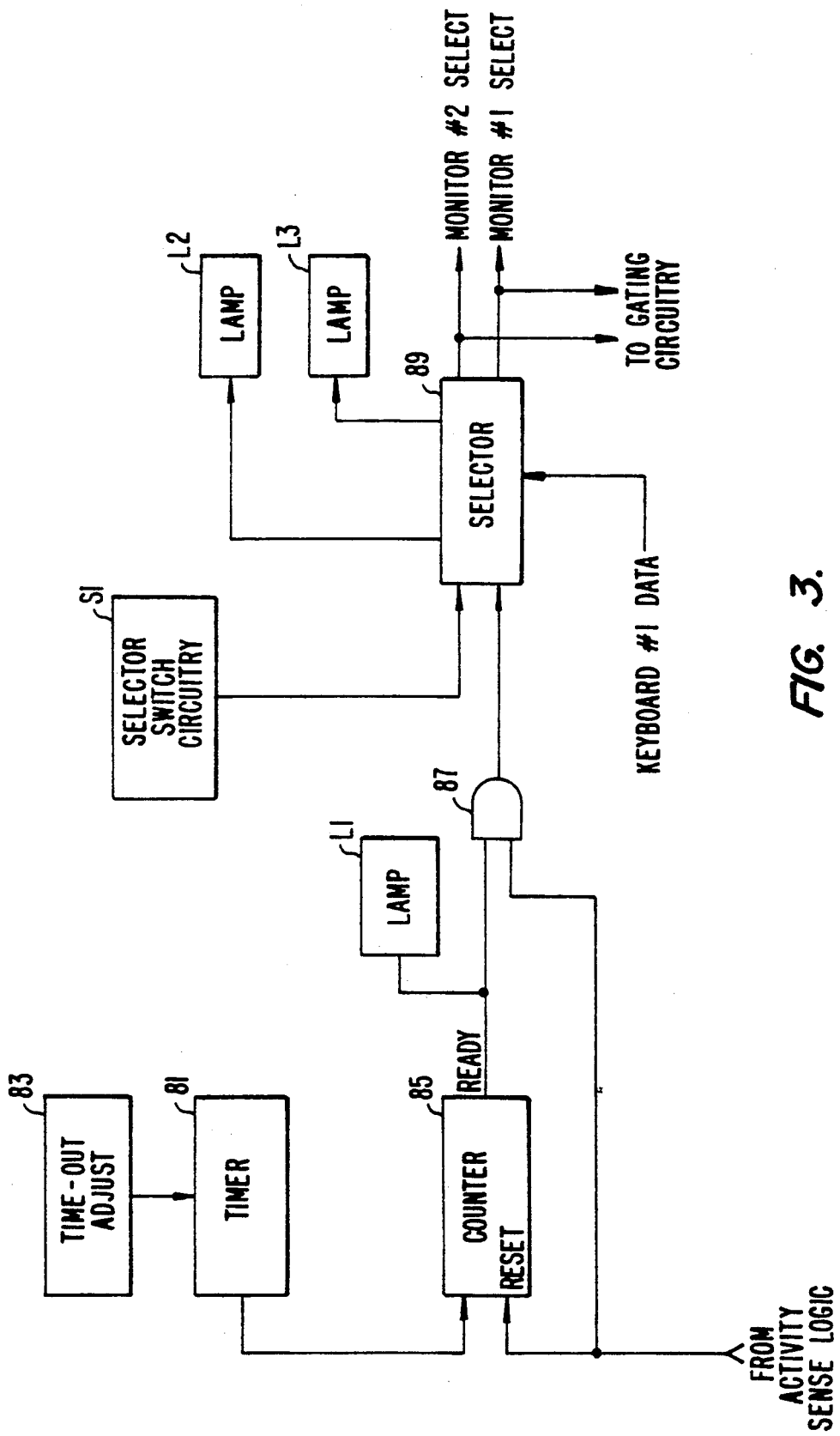
FIG. 3 is a schematic diagram of the circuitry contained in the channel select logic block of FIG. 2.

FIG. 3 is a schematic diagram showing the internal circuitry of CHANNEL SELECT BLOCK 53. A timer 81 is a standard timer which is typically a LM555 timer manufactured by National Semiconductor. The TIME OUT period for timer 81, which is used to lock-out the inactive keyboard for a preset period between keystrokes on the active keyboard may be adjusted by TIME OUT adjust circuit 83. Timer 81 is connected to a counter 85 which counts in response to signals received from timer 81.

Counter 85 is reset each time a signal is received from ACTIVITY SENSE/CONTROL BLOCK 51. Once counter 85 has counted a preset number of signals from timer 81, it transmits a signal signifying that the alternate keyboard is no longer locked-out and may take control of CPU 11. This signal is transmitted to a first input of AND gate 87. The second input of AND gate 87 receives the activity signal from ACTIVITY SENSE/CONTROL BLOCK 51. If the ready signal is active and the activity signal from ACTIVITY SENSE/CONTROL BLOCK 51 is active, AND gate 87 transmits an active signal to selector 89. Depending upon the signal coming in from first keyboard 15, selector 89 selects either first monitor 17 or second monitor 23 by transmitting a signal on the appropriate line. At the same time, the signal is sent to the gating circuitry to set gates 43, 45, 47, 49 in the proper direction and to pass signals along the appropriate path between the keyboards and CPU 11.

Selector switch S1 is connected to selector 89 and is used to place the device in either the automatic mode or the manual mode. Lamp L1 indicates that either keyboard 15 or 21 may take control of CPU 11 by depression of a key on that keyboard. Lamps L2 and L3 indicate which keyboard is currently active.

Figure 4A:
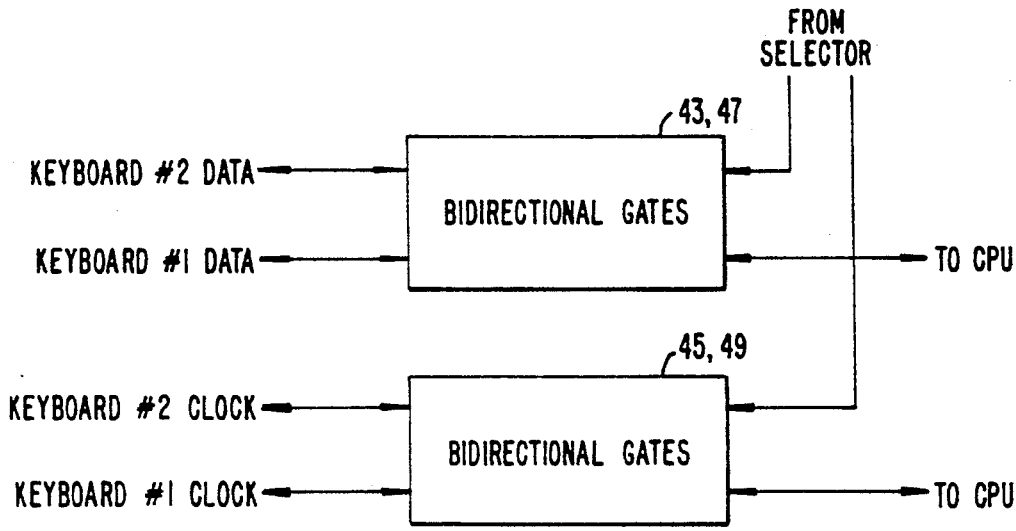
FIG. 4A is a block diagram of the direction sense and control logic block of FIG. 2.

FIG. 4A shows a block diagram of the bidirectional gates 43, 47 for handling data passing between keyboards 15, 21 and CPU 11 as well as the bidirectional gates 45 and 49 for handling the passing of clock signals between keyboards 15, 21 and CPU 11. The gates also include inputs from CHANNEL SELECT BLOCK 53 of FIG. 3. These inputs cause the circuitry within the bidirectional gates to select the appropriate communication path and the appropriate direction between CPU 11 and keyboards 15, 21.

Figure 4B:
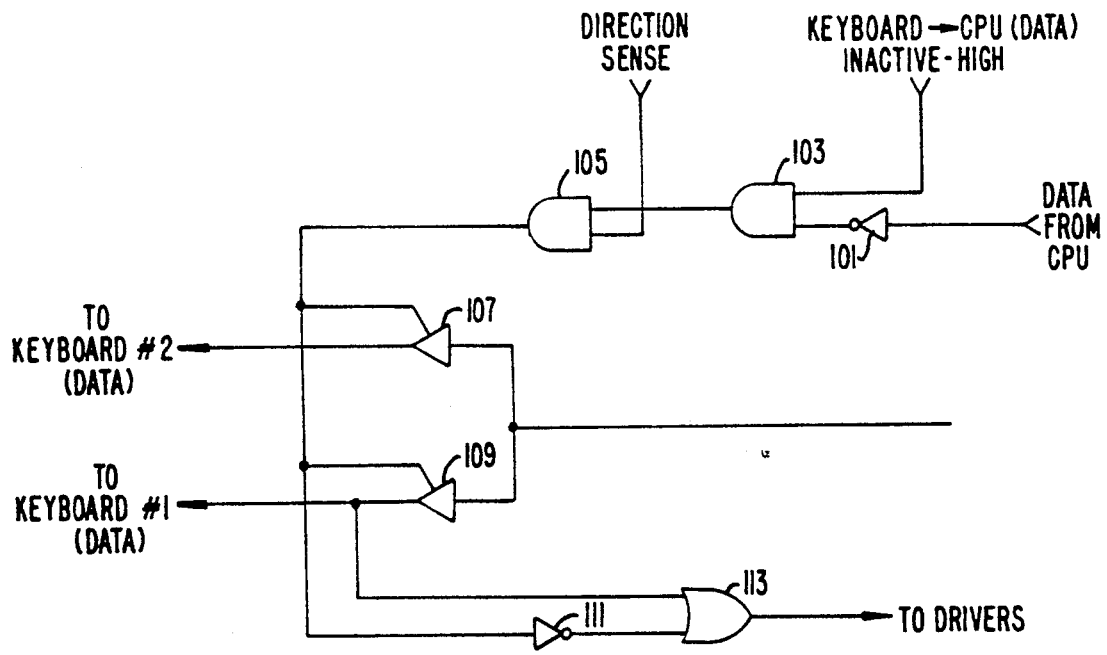
FIG. 4B is a schematic representation of the direction sense and control logic block of FIG. 2 showing transmission of data or clock signals from the CPU to the keyboard.

FIG. 4B shows a schematic diagram of the circuit components comprising the portion of bidirectional gates 43, 45, 47, and 49 for transmitting signals in the direction from CPU 11 to keyboards 15, 21. In this direction, data is always transmitted simultaneously to both keyboards 15, 21.

Data is received from CPU 11 at the input of an inverter gate 101. The data from CPU 11 is inverted and input to a first input of an AND gate 103. The second input of AND gate 103 receives a data line from the keyboards. Since this line is high when the keyboards are inactive, it will be high when no data is being sent from the keyboards. Therefore, if no data is being sent from the keyboard and data is being sent from the CPU, AND gate 103 produces a high signal on its output. This high signal is input to AND gate 105. On the other hand, if data is being transmitted from one of the keyboards, AND gate 103 will produce a low signal inhibiting data from being transmitted by CPU 11 until data transmission from the keyboard is complete. A direction sense signal is received on the other input to gate 105. When the direction sense signal indicates transmission from CPU 11 to one of keyboards 15, 21 and data is present from CPU 11, AND gate 105 produces a high output enabling a pair of tri-state buffers 107 and 109.

The input of each of tri-state buffers 107 and 109 is connected to the data line from CPU 11. Therefore, when tri-state buffers 107 and 109 are enabled, the data is transmitted through them to keyboards 15, 21. Even though only one keyboard is active at a particular time, the data is output to both keyboards anytime it is sent by CPU 11.

In addition, DIRECTION SENSE/CONTROL BLOCK 41 includes an inverter 111 and an OR gate 113. Inverter gate 111 receives the signal from AND gate 105 and inverts it before inputting it to OR gate 113. A second input of OR gate 113 receives the output of tri-state buffer 109. Therefore, if data is present on the output of tri-state buffer 109, it will be transmitted through OR gate 113 to direction separator 55 for transmission to a remote keyboard. It should be understood that the circuit for transmitting the clock signals from CPU 11 to keyboards 15, 21 is identical to the circuit shown in FIG. 4B.

Figure 4C:
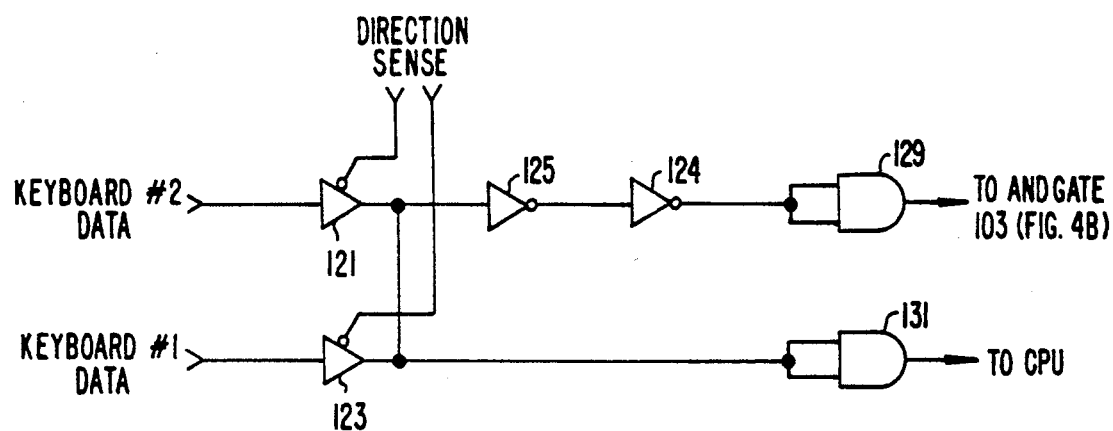
FIG. 4C is a schematic representation of the direction sense and control logic block of FIG. 2 showing transmission of data or clock signals from the keyboard to the CPU.

FIG. 4C is a schematic diagram of a circuit for handling data transmission in the direction from keyboards 15, 21 to CPU 11. The data from each keyboard is input to a tri-state device 121, 123, respectively. The enable line of each tri-state device is connected to a direction sense signal which is the same signal shown on the second input to AND gate 105 of FIG. 4B. Tri-state devices 121 and 123 are activated when the signal is in the opposite state from the signal input to AND gate 105 (FIG. 4B).

The output of tri-state devices 121 and 123 are connected to two branch circuits. The first branch includes two inverter gates 125 and 127 which set up a delay in the switching signal output from AND gate 129. This switching signal is delayed so that no interference occurs with signals from the keyboard. The output of AND gate 129 is sent to AND gate 103 (FIG. 4B) to disable transmission in the direction from CPU 11 to keyboard 15, 21.

The output of tri-state devices 121 and 123 is connected to a second branch. This branch includes an AND gate 131, both inputs of which are tied to the outputs of tri-state devices 107, 109 to receive data signals from keyboards 15, 21. The output of AND gate 131 is connected to CPU 11. As with the clock signals transmitted from CPU 11 to keyboards 15, 21, the clock signals transmitted from CPU 11 to keyboards 15, 21 are handled by a circuit which is identical to the circuit of FIG. 4C. It should be understood that the CPU clock and data lines and the keyboard clock and data lines illustrated in the various drawings are open-collector lines. These lines can be pulled low by either the CPU or the keyboards.

Figure 5A:
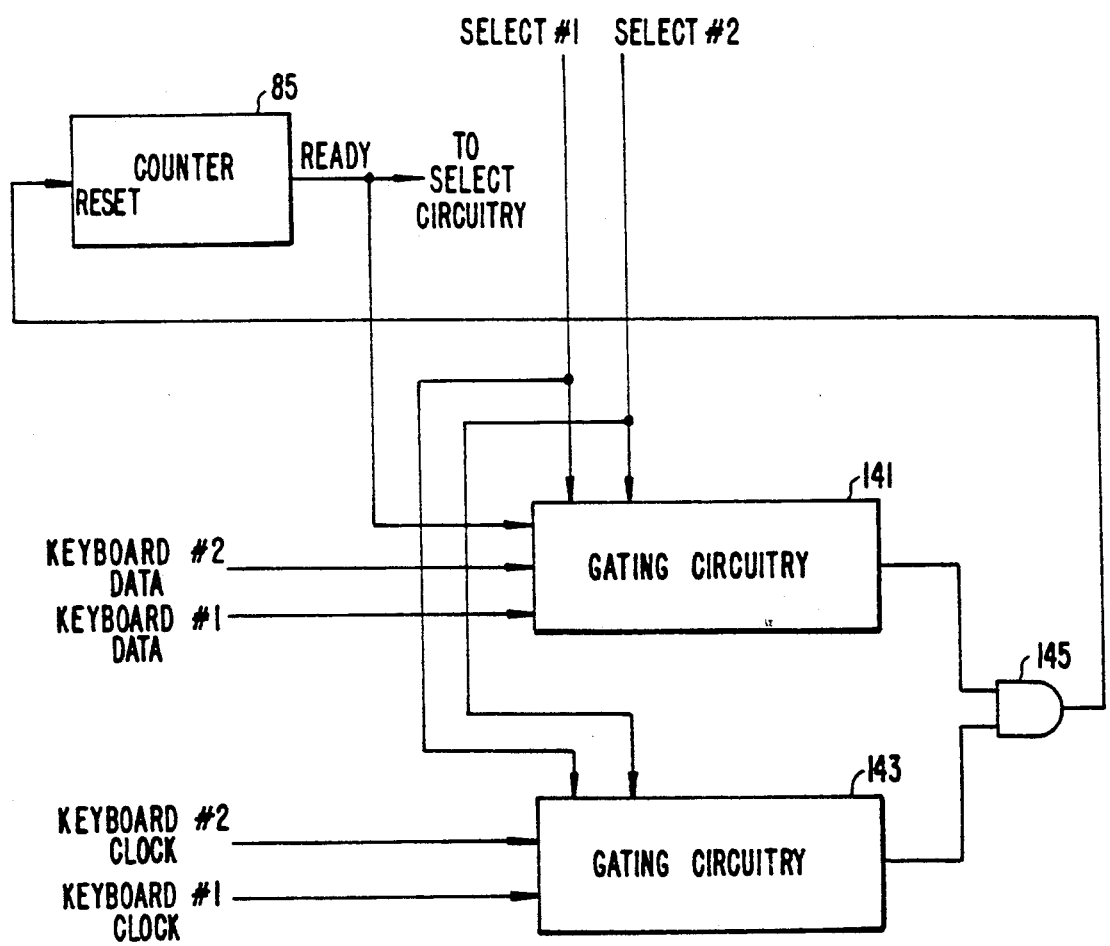
FIG. 5A is a detailed block diagram of the activity sense logic block shown in FIG. 2.

FIG. 5A is a block diagram of the circuitry for detecting activity on keyboards 15, 21. A group of gates within a GATING BLOCK 141 receive the data signals from keyboards 15, 21. The ready signal from counter 85 as well as the select signals from selector 89 are also input to GATING BLOCK 141. A second GATING BLOCK 143 receives the clock signals from keyboards 15, 21. The outputs of the two gating circuitry blocks are input to an AND gate 145, the output of which is transmitted to the reset line of counter 85. The ready line from counter 85 is input to CHANNEL SELECT BLOCK 53 to select an activated keyboard.

Figure 5B:
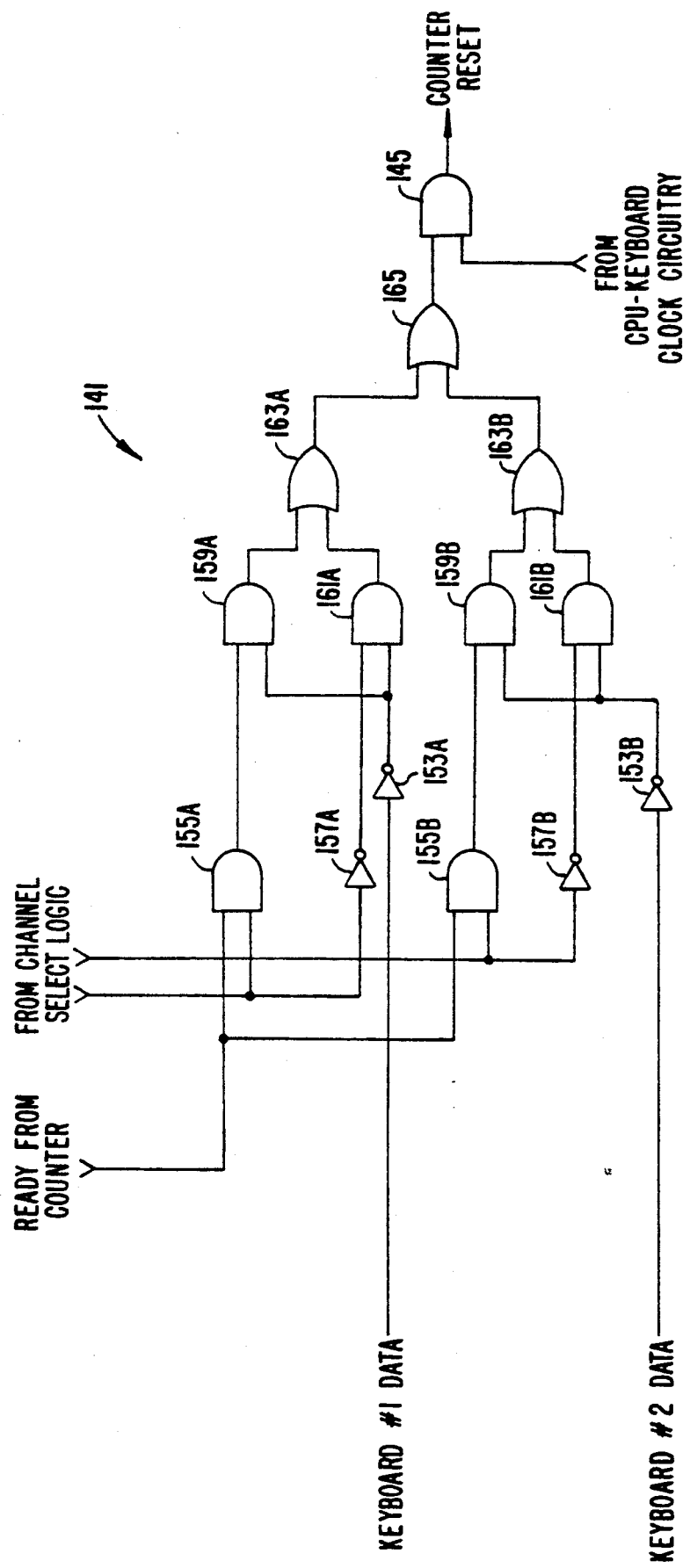
FIG. 5B is a schematic representation of the circuitry for handling the data in the activity sense logic block of FIG. 2.

FIG. 5B is a detailed illustration of the gates contained within GATING BLOCK 141 of FIG. 5A. Keyboard data from keyboard 15 is input to an inverter 153A. The data from keyboard 21 is input to an inverter 153B. At the same time, a ready signal from counter 85 is input to an AND gate 155A while the second input of AND gate 155A receives a signal from CHANNEL SELECT BLOCK 53. If the ready signal is active and this channel is selected, AND gate 155A produces a high signal. The select signal is also input to an inverter 157A. The output of AND gate 155A and inverter gate 153A are ANDed together by AND gate 159A. At the same time, the output of inverter gate 157A and inverter 153A are ANDed together by AND gate 161A. The outputs of AND gates 159A and 161A are input to OR gate 163A.

The output of inverter 153B is input to a circuit which is identical to the circuit receiving the output of inverter 153A. This circuit includes AND gates 155B, 159B, and 161B, inverter gates 153B and 157B and OR gate 163B. This circuit functions in conjunction with the above-described circuit to provide a signal on the counter reset line to reset the counter each time a key on a particular keyboard is depressed and a ready signal is received from the counter.

The circuit of FIG. 5B works to reset the counter for blocking switching for a preset time. AND gates 155 and 159 are only used when the particular branch of circuitry is not selected while inverters 153 and 157 and AND gate 161 are used when the particular branch of circuitry is selected. In the case where data appears and the channel is selected, the counter is reset. When a keyboard is not selected, the inactive keyboard is prevented from resetting the counter. In FIG. 5B, it should be understood that the data and channel select signals are both active when in the low state. Further, activity sense could be implemented with circuitry sensing the clock signals from the keyboards rather than the data as shown in FIG. 5B.

Operation of automatic switching device 25 will now be explained with reference to FIGS. 1–5. Initially, automatic switching device 25 defaults to holding keyboard 21 in the active state and keyboard 15 in the inactive state. Both monitors 17, 21 are set to display data from CPU 11 simultaneously. When a user depresses a key on keyboard 15, ACTIVITY SENSE/CONTROL LOGIC 51 senses the activity on line 52 and transmits a signal to CHANNEL SELECT LOGIC 53 to issue a select signal to keyboard 15. The channel select signal also selects bidirectional gates 43, 45 so that keyboard 15 can communicate with CPU 11. This causes keyboard 15 to be activated and locks out keyboard 21. Keyboard 21 remains locked out as long as keys are continually depressed on keyboard 15. Continuous activity on keyboard 15 resets counter 85 which is not permitted to send a ready signal to selector 89 precluding keyboard 21 from regaining control.

At the same time, DIRECTION SENSE/CONTROL BLOCK 41 receives signals from keyboard 15 and sets the direction of bidirectional gates 43, 45 to pass data and clock signals from keyboard 15 to CPU 11.

Once activity stops on keyboard 15, ACTIVITY SENSE/CONTROL BLOCK 51 senses the inactivity and causes counter 85 to send a ready signal to selector 89 and lights lamp L1 (ready lamp). When a user depresses a key on keyboard 21 ACTIVITY SENSE/CONTROL BLOCK 51 senses no activity on line 52 and transmits a signal to CHANNEL SELECT BLOCK 53 to issue a select signal to keyboard 21. CHANNEL SELECT BLOCK 53 also selects bidirectional gates 47, 49 so that keyboard 21 can communicate with CPU 11.

At the same time, DIRECTION SENSE/CONTROL BLOCK 41 receives signals from keyboard 21 and sets the direction of bidirectional gates 47, 49 accordingly to transmit signals from keyboard 21 to CPU 11.

Signals originated from CPU 11 are always sent to both monitors 17, 23 and both keyboards 15, 21 so there is no need to provide any switching for data or clock signals transmitted from CPU 11.

In general, to those skilled in the art to which this invention relates, many changes in construction and widely differing embodiments and applications of the present invention will suggest themselves without departing from its spirit and scope. For instance, the gating circuitry may be altered and need not be configured in exactly the same way as shown. Further, ACTIVITY SENSE/CONTROL BLOCK 51 could detect signals from the second keyboard rather than the first without any change to the system. Alternatively, both keyboards 15, 21 could be monitored for activity and the last keyboard to be active could maintain control. Thus, the disclosures and descriptions herein are purely illustrative and are not intended to be in any sense limiting. The scope of the invention is set forth in the appended claims.

What is claimed is:

1. An apparatus for providing access to a computer from at least two keyboard/monitor stations, wherein a first station is active for receiving information through said first station keyboard at a particular time while a second station is inactive and is not capable of receiving information through said second station keyboard, said apparatus comprising:

connection means connecting the computer and a first station keyboard and connecting the computer and a second station keyboard for providing access to the computer by only one of said first station keyboards or said second station keyboard whereby only one keyboard at a time can communicate through said connection means to said computer;

switching means coupled to said connection means for switching active access between said first station keyboard and said second station keyboard upon depression of a key on the inactive station, said switching means operative to switch said active access to one station keyboard and to disconnect said other station keyboard whereby information entered in said other station keyboard is locked out;

clock means for running a preselected period of time, said clock means operatively connected to said switch means to disable said switch means during running of said clock;

clock reset means for resetting said time interval to the beginning of said preselected period of time upon sensing depression of a key on a keyboard having access to said computer whereby said switching means is disabled for said preselected period of time after depression of a key on a keyboard having access to said computer; and activity sensing means for sensing activity on one of said stations, said activity sensing means operatively coupled to said switching means to switch said switching means responsive to sensed activity at said one of said stations.

2. The apparatus of claim 1 wherein said switching means further comprising differential drive means for converting keyboard and monitor signals to differential signals which are transmitted over long distances and are unaffected by noise and interference occurring on cables connecting a remote keyboard/monitor station to the computer.

3. The apparatus of claim 1 wherein said clock means further comprises adjustment means for adjusting said preselected time period.

4. The apparatus of claim 1 further comprising mode switching means for switching said apparatus between an automatic mode during which access is switched by depressing a key on one of said keyboards and a manual mode during which access is switched manually by a user.

5. A computer system accessible through at least two keyboard/monitor stations wherein one station is active at a particular time through said station keyboard for transmitting data to said computer while another station is inactive through said station keyboard for transmitting data to said computer, the keyboard/monitor stations being switched such that when a user depresses a key of the other station, the one station is deactivated and the other station is substantially simultaneously activated, the system comprising:

a computer;
a first station including a first keyboard for sending data to said computer;
a second station including a second keyboard for sending data to said computer;
connection means connected connecting said computer and said first station keyboard and connecting said computer and said second station keyboard for providing access to said computer by one keyboard and disconnecting the other keyboard;
switching means coupled to said connection means for switching active access to said computer between said first station and said second station upon depression of a key on an inactive station, said switching means operative to switch said active access to one station keyboard and to disconnect said other station keyboard whereby information entered in said other station keyboard is locked out;
clock means for running a preselected period of time, said clock means operatively connected to said switch means to disable said switch means during running of said clock;
clock reset means for resetting said time interval to the beginning of said preselected period of time upon sensing depression of a key on a keyboard having access to said computer whereby said switching means is disabled for said preselected period of time after depression of a key on a keyboard having access to said computer; and,
activity sensing means for sensing activity on one of said stations, said activity sensing means operatively coupled to said switching means to switch said switching means in response to sensed activity at said one of said station.

6. The apparatus of claim 5 wherein said time-out means further comprises adjustment means for adjusting said preset time period.

7. The apparatus of claim 5 further comprising mode switching means for switching said apparatus between an automatic mode during which access is switched by depressing a key on one of said keyboards and a manual mode during which occurs is switched manually by a user.

8. The apparatus of claim 5 wherein said switching means further comprising differential drive means for converting keyboard and monitor signals to differential signals which are transmitted over long distances and are unaffected by noise and interference occurring on cables connecting a remote keyboard/monitor station to the computer.

* * * * *